(12) United States Patent
Chai et al.

(10) Patent No.: US 7,965,008 B2
(45) Date of Patent: Jun. 21, 2011

(54) SERVO MOTOR AND ROTOR THEREOF

(75) Inventors: Ji Dong Chai, Shenzhen (CN); Bao Ting Liu, Shenzhen (CN); Wen Liang Li, Shenzhen (CN); Zhi Duan Shao, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 12/431,211

(22) Filed: Apr. 28, 2009

(65) Prior Publication Data

US 2009/0267437 A1    Oct. 29, 2009

(30) Foreign Application Priority Data

Apr. 28, 2008  (CN) .......................... 2008 1 0066916

(51) Int. Cl.
*H02K 21/12*    (2006.01)

(52) U.S. Cl. .............................. 310/156.25; 310/156.38

(58) Field of Classification Search ............. 310/156.26, 310/156.38–156.47
See application file for complete search history.

(56) References Cited

U.S. PATENT DOCUMENTS

| 4,739,201 | A  | * | 4/1988 | Brigham et al. ........... 310/49.01 |
| 6,252,323 | B1 | * | 6/2001 | Nishikawa et al. ...... 310/156.01 |
| 6,657,349 | B2 | * | 12/2003 | Fukushima .............. 310/156.47 |
| 7,071,592 | B1 | * | 7/2006 | Lu ............................. 310/156.25 |
| 7,245,054 | B1 | * | 7/2007 | Walls et al. ............... 310/156.25 |
| 2004/0124728 | A1 | * | 7/2004 | Yamaguchi et al. ...... 310/156.25 |
| 2004/0217665 | A1 | * | 11/2004 | Hans ........................ 310/156.47 |

* cited by examiner

*Primary Examiner* — Thanh Lam
(74) *Attorney, Agent, or Firm* — Muncy, Geissler, Olds & Lowe, PLLC

(57) ABSTRACT

A servo motor, comprising a stator and a rotor disposed within the stator. The rotor has a core and magnets, covering the periphery of the core, forming a plurality of axially extending rotor poles. The rotor poles comprise a plurality of the magnets arranged axially, and the centers of adjacent magnets of a rotor pole are staggered by a mechanical angle in the circumferential direction of the rotor.

11 Claims, 4 Drawing Sheets

SERVO MOTOR AND ROTOR THEREOF

CROSS REFERENCE TO RELATED APPLICATIONS

This non-provisional patent application claims priority under 35 U.S.C. §119(a) from Patent Application No. 200810066916.1 filed in The People's Republic of China on Apr. 28, 2008, the disclosure of which is incorporated herein by reference.

FIELD OF THE INVENTION

This invention relates to an electric motor and in particular, to a rotor for a servo motor which can reduce cogging torque.

BACKGROUND OF THE INVENTION

With the development of power electronics, servo motors have become widely used in many applications. The servo motor, as a special type of motor, has a working principle in electrical signals are transformed into angular displacement or angular velocity of the output shaft. The servo motor is easy to control, has a small volume, is relatively light weight with high output power and torque.

FIG. 7 illustrates a rotor structure of a conventional servo motor, and FIG. 8 is a graph of cogging torque verses the mechanical angle of the rotor of a conventional servo motor. As shown in FIG. 8, the torque of the servo motor of the conventional art varies in a comparatively large amplitude as the mechanical angle of the rotor varies. In this example, the difference value between the maximum value and the minimum value is about 177 mNm. This variation in the torque is known as cogging torque. Cogging torque produces cogging or a tendency for the rotor to snap to preferred angular positions. The greater the cogging torque, the greater this tendency to snap. Cogging is particularly noticeable in low speed operation as the rotor tries to snap or jump from one prepared position to the next. It also affects positional control as the rotor becomes unstable between the preferred angular positions. Generally speaking, in a permanent magnet motor, cogging torque usually is the basic cause of vibration and noise and adversely affects control precision. In a variable speed drive, when the torque frequency is consistent with the mechanical resonance frequency of the stator or rotor, the vibration and noise produced by the cogging torque will be amplified. Cogging torque also affects the low speed performance of the motor in a speed control system and the accurate positioning of the motor in a position control system.

Thus there is a desire for a servo motor which has reduced cogging torque.

SUMMARY OF THE INVENTION

A servo motor with reduced cogging is achieved in the present invention by using a rotor having permanent magnets arranged and adapted to reduce cogging.

Accordingly, in one aspect thereof, the present invention provides a rotor for a servo motor, comprising a core and magnets covering the radially outer periphery of the core and forming axially extending rotor poles, wherein the rotor poles comprise a plurality of the magnets arranged axially, and the centers of adjacent magnets of a rotor pole are staggered by a mechanical angle in the circumferential direction of the rotor.

Preferably, each magnet has the same structure, and is rectangular in shape with a cross section which is arcuate in the circumferential direction, the inner arc and outer arc being non-concentric.

Preferably, the center thickness and edge thickness of the magnets satisfy the expression: $0.23<W/H<0.4$, wherein H represents the thickness of the magnets measured at the center, and W represents the thickness of the magnets measured at the edge.

Preferably, each rotor pole has two magnets arranged axially, and (A) the mechanical angle by which the centers of the two magnets are staggered in the circumferential direction, and ($\tau$) the fundamental wave length of the cogging torque satisfy the expression: $A=\tau/2\pm10\%\tau$.

Preferably, each rotor pole has three magnets arranged axially, and (A) the mechanical angle by which the centers of adjacent magnets of a rotor pole are staggered in the circumferential direction, and ($\tau$) the fundamental wave length of the cogging torque satisfy the expression: $A=\tau/3\pm6\%\tau$.

According to a second aspect, the present invention provides a servo motor having a rotor as described above.

The advantages of some embodiments of the present invention include that by improving the shape of the magnets, the magnetic flux waveform can be made to be very similar to a sine wave. Also, by dividing the rotor poles or the rotor into two or more portions in the axial direction, and staggering adjacent portions by a predetermined mechanical angle in the circumferential direction, the fundamental wave composition of the cogging torque can be reduced or eliminated, thus reducing the cogging torque of the motor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
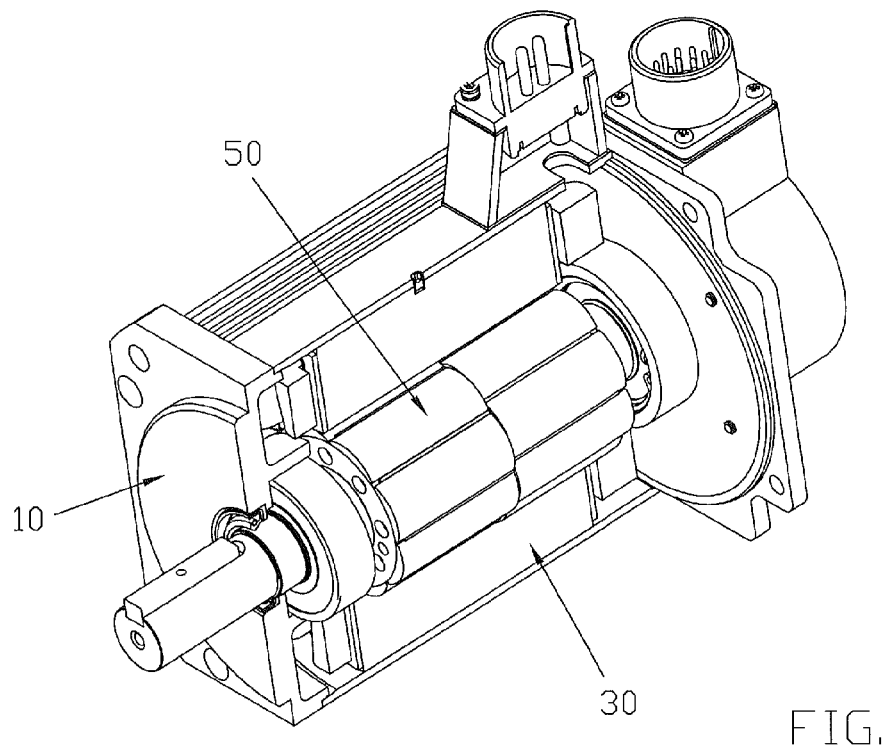
FIG. 1 is a partly sectioned isometric view of a servo motor according to a first embodiment of the present invention.

As shown in FIG. 1, the servo motor of the preferred embodiment of the present invention has a casing 10, a stator 30 and a rotor 50 disposed within an inner cavity of the stator.

Figure 2:
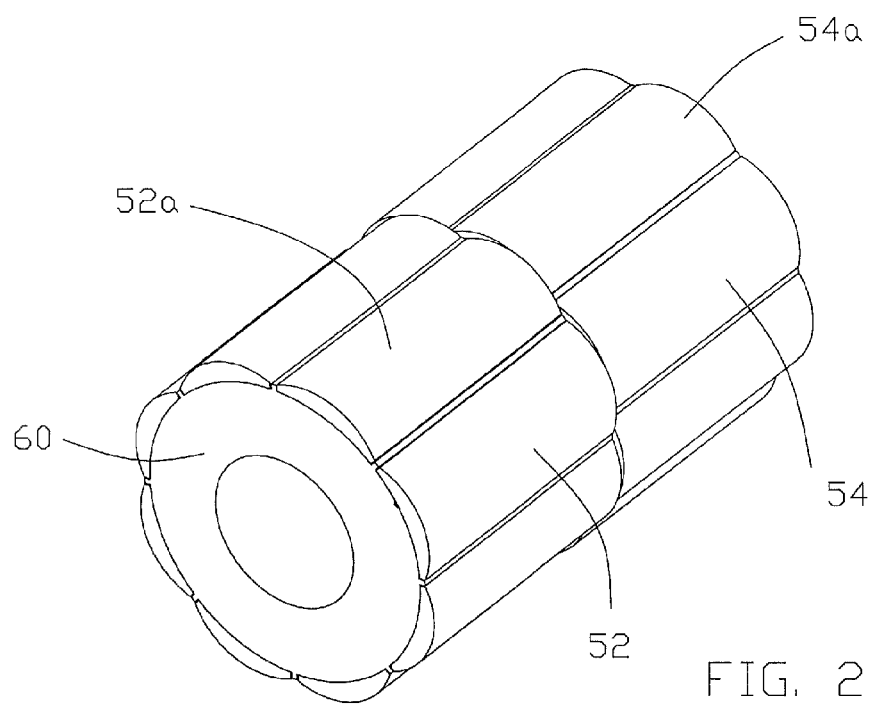
FIG. 2 is an isometric view of a rotor, being a part of the servo motor of FIG. 1.

FIG. 2 illustrates a rotor with the motor shat removed for clarity. The rotor 50 comprises a rotor core 60 and a plurality of magnets covering a radially outer surface of the core 60. The magnets form a number of rotor poles which extend axially of the rotor. Each magnet has a center and two longitudinal edges which confront or face magnets of adjacent rotor poles, usually across a small gap. Each rotor pole has two or more magnets 52a, 54a, arranged axially. The magnets of each rotor pole are offset or staggered by a predetermined mechanical angle A, such that the rotor may be divided into a plurality of rotor portions 52, 54, in which the centers of the magnets of adjacent portions are offset or staggered in the circumferential direction of the core 60 to produce a skewing of the resultant magnetic field of the rotor pole. In the preferred embodiment shown in FIG. 2, the rotor has two rotor portions 52, 54 and the rotor poles each have two magnets.

Figure 3:
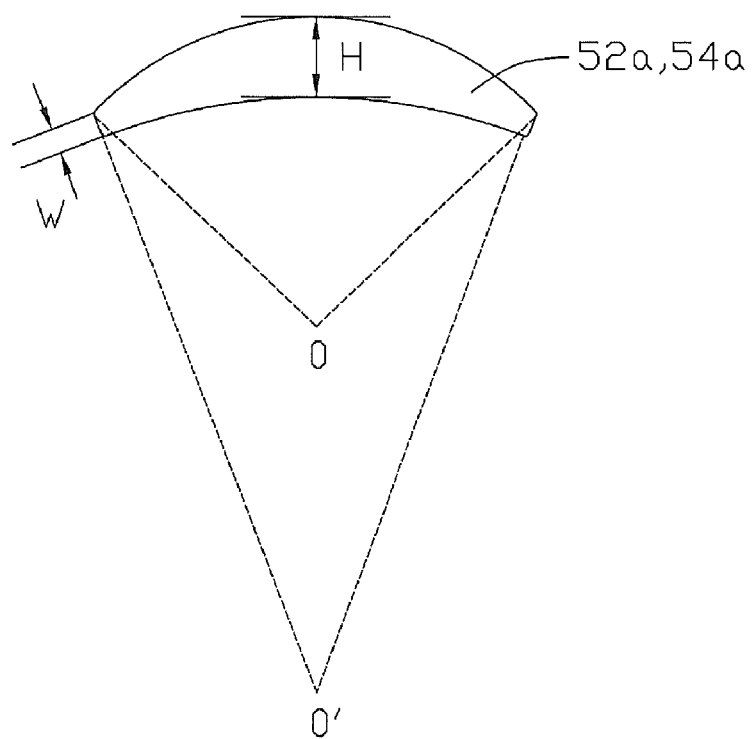
FIG. 3 is an end view of a magnet, being a part of the rotor of FIG. 2.

Referring to FIG. 3, each magnet 52a, 54a is rectangular in shape with an arcuate cross section producing an inner arcuate surface which matches the surface of the rotor core and an outer arcuate surface. The arcs of the inner and outer arcuate surfaces are not concentric. This is illustrated in FIG. 3 where an end view of a magnet is shown. O represents the radial center of the outer arcuate surface and O' represents the radial center of the inner arcuate surface. Thus the two surfaces are not concentric.

The magnets are shaped such that the magnets have a profile in which the magnets have a constant transverse cross section as shown in FIG. 3 and a thickness which is greater in the center than at the longitudinal edges. This profile is such as to satisfy the expression:

$$0.23 < W/H < 0.4 \quad (I)$$

wherein, W represents the edge thickness of the magnet 52a, 54a, and H represents the center thickness of the magnet 52a, 54a.

Figure 4:
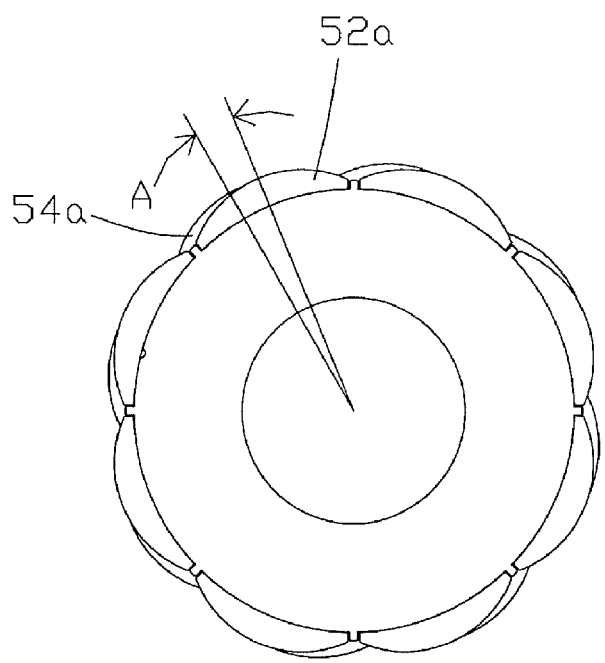
FIG. 4 is an end view of the rotor of FIG. 2.

The staggering of the magnets of the rotor poles is illustrated in FIG. 4, which is an end view of the rotor. The centers of the magnetic poles of adjacent two magnets of the rotor portions 52, 54 are staggered by a mechanical angle (A) in the circumferential direction. The stagger angle A is determined based on (τ) the fundamental wave length of the cogging torque expressed in degrees as define below. The stagger angle A is determined according to the expression:

$$A = \tau/2 \pm 10\%\tau \quad (II),$$

and $$\tau = 360/LCM(P:R) \quad (III)$$

wherein LCM (P:R) is the lowest common multiple of P and R, where P is the number of stator poles and R is the number of rotor poles.

For example, in the preferred embodiment with 12 stator poles and 8 rotor poles, the lowest common multiple of 12 and 8 is 24 and thus τ equals 15 and A equals 7.5±1.5.

Figure 5:
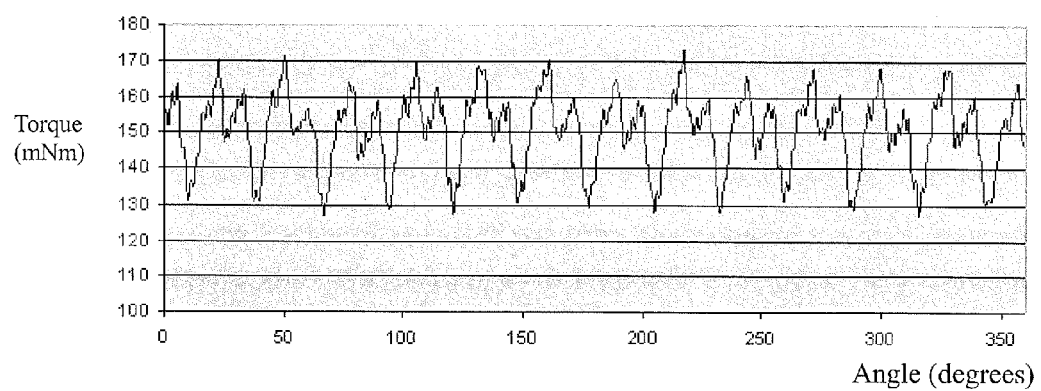
FIG. 5 is a typical graph of torque verses angular displacement of the rotor for the servo motor of FIG. 1.
Figure 8:
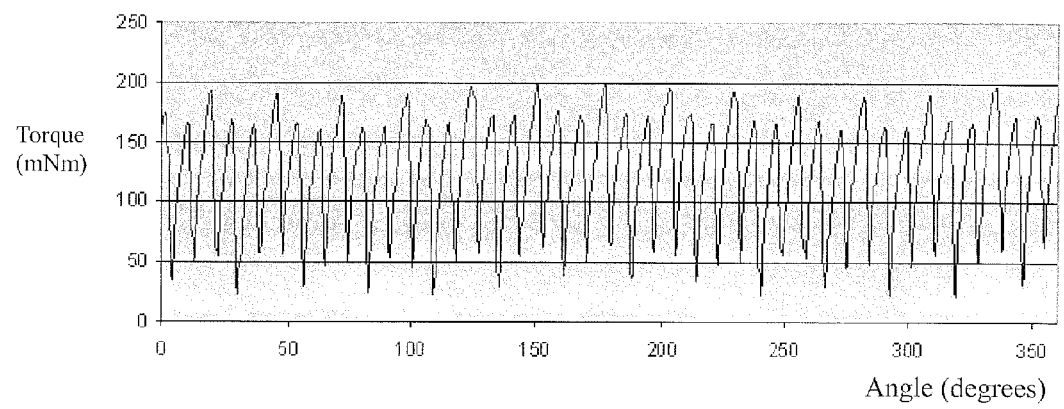
FIG. 8 is a graph of torque verses angular displacement of the rotor for a conventional servo motor using the rotor of FIG. 6.

FIG. 5 is a graph of torque verses the mechanical angle of the rotor of a servo motor provided by an embodiment of the present invention, and FIG. 8 is a similar graph for a conventional servo motor. By comparing the two graphs, it can be seen that the cogging torque (the variation in the torque) of the servo motor provided by the embodiment of the present invention is about 46 mNm, which is a reduction of 75%-80% compared with the conventional servo motor (177 mNm).

In the above mentioned embodiment of the present invention, by changing the shape of the magnets, the magnetic flux waveform can be made sinusoidal, or close thereto. The rotor is also divided into two portions in the axial direction, with adjacent portions being staggered by a predetermined mechanical angle A in the circumferential direction. The stagger angle A can reduce or eliminate the fundamental wave component of the cogging torque, thus reducing the cogging torque of the motor.

It is to be understood that, in the present invention, the number of staggered portions of the rotor in the axial direction is not limited to two. For example, when there are three staggered rotor portions, the rotor poles each have three magnets arranged axially and offset circumferentially by an angle A, according to the expression:

$$A = \tau/3 \pm 6\%\tau \quad (II')$$

wherein, A represents the mechanical angle by which the centers of adjacent magnets of each magnetic pole are staggered in the circumferential direction of the rotor, and τ represents the fundamental wave length of the cogging torque as defined in expression (III) above.

Figure 6:
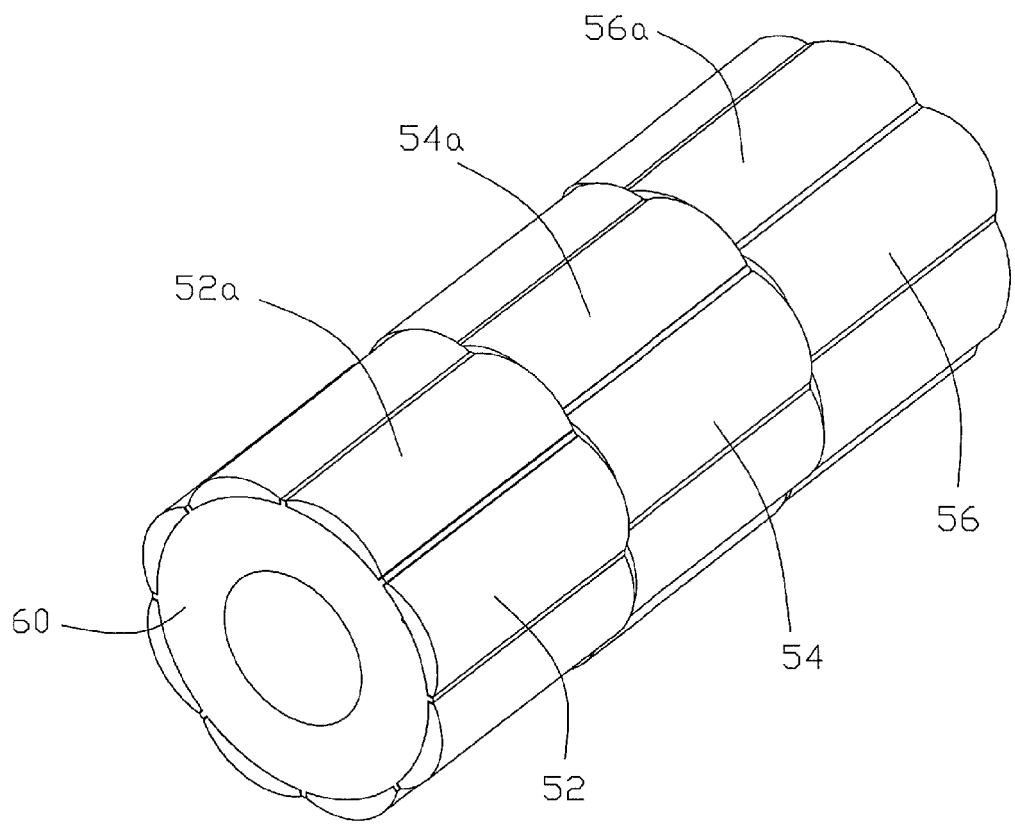
FIG. 6 is an isometric view, similar to FIG. 2, of a rotor core according to a second embodiment.
Figure 7:
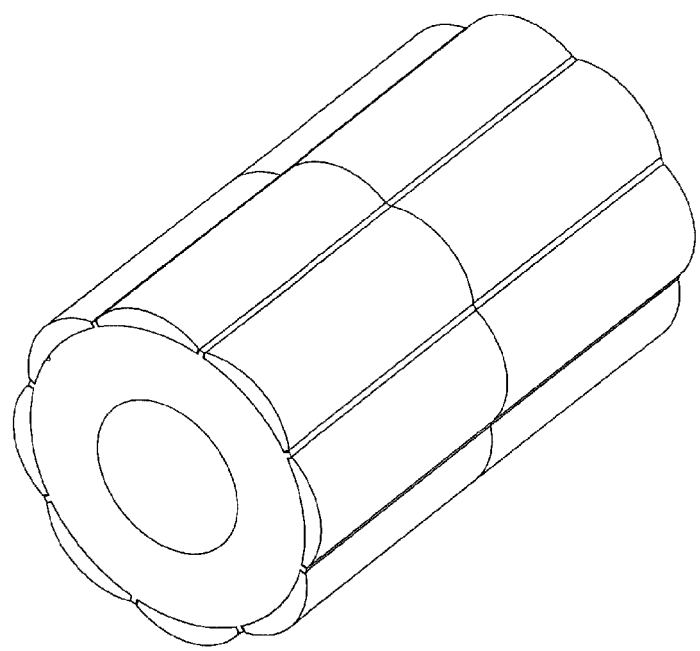
FIG. 7 is an isometric view of a rotor core, similar to FIG. 2, of a conventional servo motor.

For example, in the embodiment with 12 stator poles and 8 rotor poles, the lowest common multiple of 12 and 8 is 24 and thus τ equals 15 and A equals 5.0±0.9. FIG. 6 illustrates such a rotor with three rotor portions 52, 54, 56, with each of the rotor poles having three axially arranged magnets 52a, 54a, 56a.

In theory, the rotor may have any number of rotor portions and for embodiments with more that three portions, the stagger angle A is approximately equal to the fundamental cogging torque wavelength divided by the number of rotor portions. i.e., A=τ/n±x, wherein n is the number of rotor portions and x is a tolerance factor. In practice, the use of more than three rotor portions is not likely due to manufacturing issues.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A rotor for a servo motor, comprising a core and magnets covering the radially outer periphery of the core and forming axially extending rotor poles, wherein the rotor poles comprise a plurality of said magnets arranged axially, and the centers of adjacent magnets of a rotor pole are staggered by a mechanical angle in the circumferential direction of the core, wherein the magnets have an arcuate cross section with an inner arcuate surface and an outer arcuate surface, and a thickness which is greater in the center than at the longitudinal edges.

2. The rotor of claim 1, wherein each magnet has the same structure, and is rectangular in shape with a cross section which is arcuate in the circumferential direction, the inner arc and outer arc being non-concentric.

3. The rotor of claim 1, wherein the center thickness and edge thickness of the magnets satisfy the expression:

$$0.23 < W/H < 0.4,$$

wherein H represents the thickness of the magnets measured at the center, and W represents the thickness of the magnets measured at the edge.

4. The rotor of claim 1, wherein each rotor pole has two magnets arranged axially, and (A) the mechanical angle by which the centers of the two magnets are staggered in the circumferential direction, and (τ) the fundamental wave length of the cogging torque satisfy the expression:

$$A = \tau/2 \pm 10\%\tau.$$

5. The rotor of claim 1, wherein each rotor pole has three magnets arranged axially, and (A) the mechanical angle by which the centers of adjacent magnets of a rotor pole are staggered in the circumferential direction, and (τ) the fundamental wave length of the cogging torque satisfy the expression:

$A = \tau/3 \pm 6\%\tau.$

6. A servo motor comprising: a stator; and a rotor disposed within an inner cavity of the stator, the rotor having a core and a plurality of magnets covering the radially outer periphery of the core and forming axially extending rotor poles, wherein the rotor poles comprise a plurality of said magnets arranged axially, and the centers of adjacent magnets of a rotor pole are staggered by a mechanical angle in the circumferential direction of the core, wherein the magnets have an arcuate cross section with an inner arcuate surface and an outer arcuate surface, and a thickness which is greater in the center than at the longitudinal edges.

7. The servo motor of claim 6, wherein each magnet has the same structure, and is rectangular in shape with a cross section which is arcuate in the circumferential direction, the inner arc and outer arc being non-concentric.

8. The servo motor of claim 6, wherein the center thickness and edge thickness of the magnets satisfy the expression:

$0.23 < W/H < 0.4,$ wherein H represents the thickness of the magnets measured at the center, and W represents the thickness of the magnets measured at the edge.

9. The servo motor of claim 6, wherein each rotor pole has two magnets arranged axially, and (A) the mechanical angle by which the centers of the two magnets are staggered in the circumferential direction, and (τ) the fundamental wave length of the cogging torque satisfy the expression:

$A = \tau/2 \pm 10\%\tau.$

10. The servo motor of claim 6, wherein each rotor pole has three magnets arranged axially, and (A) the mechanical angle by which the centers of adjacent magnets of a rotor pole are staggered in the circumferential direction, and (τ) the fundamental wave length of the cogging torque satisfy the expression:

$A = \tau/3 \pm 6\%\tau.$

11. The servo motor of claim 9, wherein the stator comprises 12 stator poles and 8 rotor poles, and τ equals 15 and A equals 7.5±1.5 degrees.

* * * * *